US012567773B2

(12) United States Patent
Kamogi et al.

(10) Patent No.: US 12,567,773 B2
(45) Date of Patent: Mar. 3, 2026

(54) MOTOR WITH STATOR SEGMENTS COUPLED VIA PROTRUDING PARTS AND RECESSES WITH DIFFERENT PLANES

(71) Applicant: MINEBEA MITSUMI Inc., Nagano (JP)

(72) Inventors: Yutaka Kamogi, Kitasaku-gun (JP); Yutaka Kouyama, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 351 days.

(21) Appl. No.: 18/253,125

(22) PCT Filed: Nov. 19, 2021

(86) PCT No.: PCT/JP2021/042546
§ 371 (c)(1),
(2) Date: Aug. 29, 2023

(87) PCT Pub. No.: WO2022/107875
PCT Pub. Date: May 27, 2022

(65) Prior Publication Data
US 2023/0421002 A1 Dec. 28, 2023

(30) Foreign Application Priority Data
Nov. 20, 2020 (JP) ................................. 2020-193734

(51) Int. Cl.
*H02K 1/14* (2006.01)
(52) U.S. Cl.
CPC .................................... *H02K 1/148* (2013.01)
(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS 452,718 A * 5/1891 Riker ....................... H02K 1/14
310/216.011
893,711 A * 7/1908 Cushman ............... H02K 1/148
310/216.127
(Continued)

FOREIGN PATENT DOCUMENTS

DE 10 2010 028 509 A1 7/2011
JP 2000-152529 A 5/2000
(Continued)

OTHER PUBLICATIONS

International Search Report for corresponding International Application No. PCT/JP2021/042546 mailed Dec. 28, 2021.
(Continued)

*Primary Examiner* — Maged M Almawri
(74) *Attorney, Agent, or Firm* — Chrisman Gallo Tochtrop LLC

(57) ABSTRACT

A motor includes a rotor and a stator. The stator includes a plurality of segments coupled via engaging parts. The segment includes a plurality of pieces coupled via a coupling part. The plurality of pieces are disposed in an arc shape. The plurality of segments are disposed in an annular shape. The engaging part has two protruding parts projecting to a circumferential direction side and a recess part provided between the two protruding parts. Among the two segments disposed adjacently, the protruding part of one segment is engaged with the recess part of the other segment, and the recess part of the one segment is engaged with the protruding part of the other segment. The two protruding parts of the one segment and the other segment have top parts, and the protruding part of the one segment and the recess part of the other segment have a first plane and a third plane opposing one another. The first plane and the third plane extend in a radial direction and a circumferential direction of the stator,
(Continued)

and extend in directions intersecting one another toward the top part.

5 Claims, 13 Drawing Sheets

(58) Field of Classification Search
CPC ............ H02K 1/146; H02K 1/16; H02K 1/18; H02K 1/182; H02K 1/185; H02K 1/187; H02K 1/06; H02K 15/022; H02K 3/522
USPC .... 310/49.29, 254.1, 126, 216.001, 216.113, 310/216.125–216.129, 216.131–216.137
See application file for complete search history.

(56) References Cited

U.S. PATENT DOCUMENTS

| | | | | | |
|---|---|---|---|---|---|
| 932,537 | A | * | 8/1909 | Cushman | H02K 23/22 310/216.096 |
| 1,005,858 | A | * | 10/1911 | Lord | H02K 23/22 310/224 |
| 1,227,414 | A | * | 5/1917 | Field | H02K 3/487 310/214 |
| 1,756,672 | A | * | 4/1930 | Barr | H02K 1/16 174/DIG. 20 |
| 1,835,120 | A | * | 12/1931 | Poole | H01R 43/06 29/733 |
| 2,495,218 | A | * | 1/1950 | Aske | H02K 15/021 29/609 |
| 2,736,829 | A | * | 2/1956 | Sills | H02K 1/08 310/216.098 |
| 5,223,761 | A | * | 6/1993 | Larsen | H02K 1/148 310/185 |
| 5,786,651 | A | * | 7/1998 | Suzuki | H02K 15/022 310/216.009 |
| 5,859,486 | A | * | 1/1999 | Nakahara | H02K 1/148 310/216.084 |
| 5,986,377 | A | * | 11/1999 | Yamada | H02K 15/022 310/216.013 |
| 6,044,737 | A | * | 4/2000 | Yao | H02K 1/146 83/13 |
| 6,121,711 | A | * | 9/2000 | Nakahara | H02K 3/522 310/216.096 |
| 6,184,597 | B1 | * | 2/2001 | Yamamoto | H02K 33/16 310/23 |
| 6,265,804 | B1 | | 7/2001 | Nitta et al. | |
| 6,452,303 | B1 | * | 9/2002 | Marioni | H02K 1/148 310/254.1 |
| 6,960,861 | B2 | * | 11/2005 | Yoneda | H02K 1/148 310/216.012 |
| 6,975,057 | B2 | * | 12/2005 | Gauthier | H02K 11/21 310/262 |
| 7,042,130 | B2 | * | 5/2006 | Zepp | H02K 1/148 310/216.102 |
| 7,414,347 | B2 | * | 8/2008 | Wang | H02K 3/522 310/260 |
| 7,592,727 | B1 | * | 9/2009 | Doughty | H02K 49/046 310/105 |
| 7,777,387 | B2 | * | 8/2010 | Nagai | H02K 15/026 310/216.013 |
| 7,982,356 | B2 | * | 7/2011 | Buban | H02K 1/148 310/216.118 |
| 7,986,064 | B2 | * | 7/2011 | Katagiri | H02K 1/148 310/43 |
| 8,106,561 | B2 | * | 1/2012 | Myojin | H02K 1/148 310/216.013 |
| 8,319,389 | B2 | * | 11/2012 | Haran | H02K 1/185 310/216.109 |
| 8,413,318 | B2 | * | 4/2013 | Ikeda | H02K 15/022 336/200 |
| 8,466,596 | B2 | * | 6/2013 | Maki | H02K 1/148 310/216.043 |
| 8,689,427 | B2 | * | 4/2014 | Bourqui | H02K 1/148 310/216.074 |
| 8,941,274 | B2 | * | 1/2015 | Gianni | H02K 1/148 310/216.013 |
| 9,634,533 | B2 | * | 4/2017 | Uchitani | H02K 3/522 |
| 10,153,677 | B2 | * | 12/2018 | Honda | H02K 5/08 |
| 10,291,084 | B2 | * | 5/2019 | Utsumi | H02K 15/022 |
| 10,348,163 | B2 | * | 7/2019 | Lin | H02K 1/148 |
| 10,505,407 | B2 | * | 12/2019 | Nagao | H02K 3/345 |
| 10,833,542 | B2 | * | 11/2020 | Ge | H02K 1/148 |
| 10,910,892 | B2 | * | 2/2021 | Hirotani | H02K 3/48 |
| 11,456,629 | B2 | * | 9/2022 | Sato | H02K 1/148 |
| 11,870,303 | B2 | * | 1/2024 | Lust | H02K 1/148 |
| 2002/0070629 | A1 | * | 6/2002 | Dawson | H02K 1/12 310/216.051 |
| 2003/0052573 | A1 | * | 3/2003 | Wischnewskiy | H02N 2/026 310/322 |
| 2003/0098628 | A1 | * | 5/2003 | Enomoto | H02K 15/022 310/216.057 |
| 2004/0189137 | A1 | * | 9/2004 | Hashimoto | H02K 29/03 310/402 |
| 2004/0217669 | A1 | * | 11/2004 | Fujii | H02K 1/148 310/216.045 |
| 2004/0256919 | A1 | * | 12/2004 | Hashimoto | H02K 41/03 310/12.25 |
| 2005/0067912 | A1 | * | 3/2005 | Murakami | H02K 1/148 310/216.043 |
| 2005/0125988 | A1 | * | 6/2005 | Fukatsu | H02K 15/06 29/596 |
| 2006/0028087 | A1 | * | 2/2006 | Lonel | H02K 1/148 310/216.086 |
| 2006/0066171 | A1 | * | 3/2006 | Yanoi | H02K 1/148 310/254.1 |
| 2006/0279160 | A1 | * | 12/2006 | Yoshinaga | H02K 1/148 310/216.049 |
| 2007/0096587 | A1 | * | 5/2007 | Lonel | H02K 1/148 310/180 |
| 2007/0196615 | A1 | * | 8/2007 | Bach Andersen | H02K 1/148 428/57 |
| 2007/0247008 | A1 | * | 10/2007 | Miyamoto | H02K 41/03 310/14 |
| 2008/0061653 | A1 | * | 3/2008 | Sagara | H02K 1/148 310/254.1 |
| 2009/0066183 | A1 | * | 3/2009 | Aramaki | H02K 1/148 310/216.008 |
| 2009/0072647 | A1 | * | 3/2009 | Hino | H02K 1/276 903/906 |
| 2009/0140526 | A1 | * | 6/2009 | Jansen | H02K 16/02 310/156.01 |
| 2009/0256438 | A1 | * | 10/2009 | Ikeda | H02K 3/522 310/71 |
| 2010/0001611 | A1 | * | 1/2010 | Utaka | H02K 1/16 310/216.009 |
| 2010/0066199 | A1 | * | 3/2010 | Shinagawa | H02K 1/148 310/216.113 |
| 2010/0090560 | A1 | * | 4/2010 | Myojin | H02K 15/02 310/216.043 |
| 2010/0135830 | A1 | * | 6/2010 | Yasuda | H02K 1/146 310/216.069 |
| 2010/0213785 | A1 | * | 8/2010 | Nagai | H02K 1/148 310/216.043 |
| 2010/0225179 | A1 | * | 9/2010 | Wang | H02K 41/031 310/12.26 |
| 2011/0101816 | A1 | * | 5/2011 | Kondou | H02K 1/16 310/216.069 |
| 2011/0115314 | A1 | * | 5/2011 | Du | H02K 1/14 310/50 |
| 2011/0169368 | A1 | * | 7/2011 | Tsumagari | H02K 1/12 310/216.009 |
| 2011/0223045 | A1 | * | 9/2011 | Sasaki | H02K 1/143 310/43 |
| 2012/0272512 | A1 | * | 11/2012 | Uchiumi | H02K 15/35 29/596 |
| 2013/0026878 | A1 | * | 1/2013 | Feuerrohr | A23L 2/52 310/216.136 |

(56) References Cited

U.S. PATENT DOCUMENTS

| | | | | | |
|---|---|---|---|---|---|
| 2013/0076195 | A1* | 3/2013 | Li | | H02K 21/16 |
| | | | | | 310/216.097 |
| 2013/0169097 | A1* | 7/2013 | Saban | | H02K 21/22 |
| | | | | | 310/152 |
| 2014/0062249 | A1* | 3/2014 | Nagao | | B21D 53/00 |
| | | | | | 310/216.089 |
| 2014/0346918 | A1* | 11/2014 | Uchitani | | H02K 15/022 |
| | | | | | 29/598 |
| 2014/0361657 | A1* | 12/2014 | Vohlgemuth | | H02K 15/022 |
| | | | | | 29/596 |
| 2015/0263572 | A1* | 9/2015 | Hyppias | | H02K 1/146 |
| | | | | | 310/156.01 |
| 2015/0333577 | A1* | 11/2015 | Jang | | H02K 1/148 |
| | | | | | 29/596 |
| 2015/0364954 | A1* | 12/2015 | Senoo | | H02K 1/14 |
| | | | | | 310/216.009 |
| 2016/0043598 | A1* | 2/2016 | Chang | | H02K 1/14 |
| | | | | | 310/254.1 |
| 2016/0099616 | A1* | 4/2016 | Hino | | H02K 1/16 |
| | | | | | 310/216.043 |
| 2016/0164350 | A1* | 6/2016 | Matsunaga | | B32B 15/043 |
| | | | | | 156/219 |
| 2016/0164351 | A1* | 6/2016 | Weiske | | H02K 15/095 |
| | | | | | 29/596 |
| 2016/0172921 | A1* | 6/2016 | Yoshinori | | H02K 3/28 |
| | | | | | 310/215 |
| 2016/0211717 | A1* | 7/2016 | Honda | | F04D 13/0693 |
| 2016/0365778 | A1* | 12/2016 | Yu | | H02K 3/345 |
| 2017/0149295 | A1* | 5/2017 | Kawasaki | | H02K 1/148 |
| 2018/0159389 | A1* | 6/2018 | Nishikawa | | H02K 1/148 |
| 2018/0278138 | A1* | 9/2018 | Satou | | H02K 41/02 |
| 2019/0157919 | A1* | 5/2019 | Ge | | H02K 1/148 |
| 2019/0157921 | A1* | 5/2019 | Nishikawa | | H02K 1/146 |
| 2019/0296597 | A1* | 9/2019 | An | | H02K 3/34 |
| 2019/0305654 | A1* | 10/2019 | Matsubayashi | | H01F 41/02 |
| 2019/0363621 | A1* | 11/2019 | Myojin | | H02K 15/12 |
| 2019/0393739 | A1* | 12/2019 | Seo | | H02K 1/148 |
| 2020/0119600 | A1* | 4/2020 | Inuzuka | | H02K 7/145 |
| 2020/0244113 | A1* | 7/2020 | Deng | | H02K 15/022 |
| 2020/0269678 | A1* | 8/2020 | Okabe | | H02K 5/1732 |
| 2020/0403460 | A1* | 12/2020 | Higashiyama | | H02K 21/22 |
| 2021/0091610 | A1* | 3/2021 | Walter | | H02K 1/148 |
| 2021/0320539 | A1 | 10/2021 | Kamogi et al. | | |
| 2021/0408849 | A1* | 12/2021 | Egashira | | H02K 15/021 |
| 2022/0294281 | A1* | 9/2022 | Lust | | H02K 1/148 |
| 2023/0048985 | A1* | 2/2023 | Yamada | | H02K 1/185 |

FOREIGN PATENT DOCUMENTS

| | | | |
|---|---|---|---|
| JP | 2010178426 | A | 8/2010 |
| JP | 2011-172353 | A | 9/2011 |
| JP | 2014-036508 | A | 2/2014 |
| JP | 2015-100166 | A | 5/2015 |
| WO | 2018-168610 | A1 | 9/2018 |
| WO | 2020/039682 | A1 | 2/2020 |

OTHER PUBLICATIONS

Written Opinion for corresponding International Application No. PCT/JP2021/042545 mailed Dec. 28, 2021.

English translation of Written Opinion for corresponding International Application No. PCT/JP2021/042546 dated Dec. 28, 2021.

Written Opinion for corresponding International Application No. PCT/JP2021/042546 mailed Dec. 28, 2021 (previously submitted on May 23, 2023—International Appln. No. has been Corrected).

Extended European Search Report dated Mar. 1, 2024 for corresponding European Application No. 21894746.3.

* cited by examiner

MOTOR WITH STATOR SEGMENTS COUPLED VIA PROTRUDING PARTS AND RECESSES WITH DIFFERENT PLANES

CROSS-REFERENCE TO RELATED APPLICATIONS

This application is a national stage entry of International Application No. PCT/JP2021/042546 filed on Nov. 19, 2021, which claims the benefit of priority to Japanese Application No. JP2020-193734, filed Nov. 20, 2020, the entire disclosures of which are hereby incorporated herein by reference.

TECHNICAL FIELD

The present invention relates to a motor.

BACKGROUND ART

Conventionally, there is known a motor configured by stacking a plurality of segment-shaped steel sheets in a plate thickness direction to form segments, assembling the segments in an annular shape to form a stator, and combining the stator and a rotor.

CITATION LIST

Patent Literature

Patent Document 1: JP 2000-152529 A

SUMMARY OF INVENTION

Technical Problem

In the conventional stator, the steel sheets are punched into a segment shape formed by coupling a plurality of pieces, and the punched steel sheets are then stacked and bent inward to form arch-shaped segments. Then, the arch-shaped segments are combined in an annular shape to constitute a stator. However, when the plurality of segments are combined in the annular shape, the engaging parts are engaged with one another so as to be merely in contact. In this case, engagement between the mutual engaging parts of the segments is insufficient. Therefore, the segments move outward or inward about the engaging parts, causing roundness when the plurality of segments are assembled in the annular shape to deteriorate. Additionally, when assembly positions of the segments deviate, assembling the segments to a housing is difficult.

The present invention raises the problem described above as one example, and one object is to improve roundness of a stator.

Solution to Problem

A motor according to one aspect of the present invention includes a rotor and a stator. The stator includes a plurality of segments coupled via engaging parts. The segment includes a plurality of pieces coupled via a coupling part. The plurality of pieces are disposed in an arc shape. The plurality of segments are disposed in an annular shape. The engaging part includes two protruding parts projecting to a circumferential direction side and a recess part provided between the two protruding parts. Of two segments disposed adjacently, the protruding part of one segment engages with the recess part of the other segment, and the recess part of the one segment engages with the protruding part of the other segment. The two protruding parts of the one segment and the other segment have top parts, and the protruding part of the one segment and the recess part of the other segment have a first plane and a third plane opposing one another. The first plane and the third plane extend in a radial direction and a circumferential direction of the stator, and extend in directions intersecting one another toward the top part.

According to one aspect of the present invention, roundness of the stator can be improved.

DESCRIPTION OF EMBODIMENTS

Figure 1:
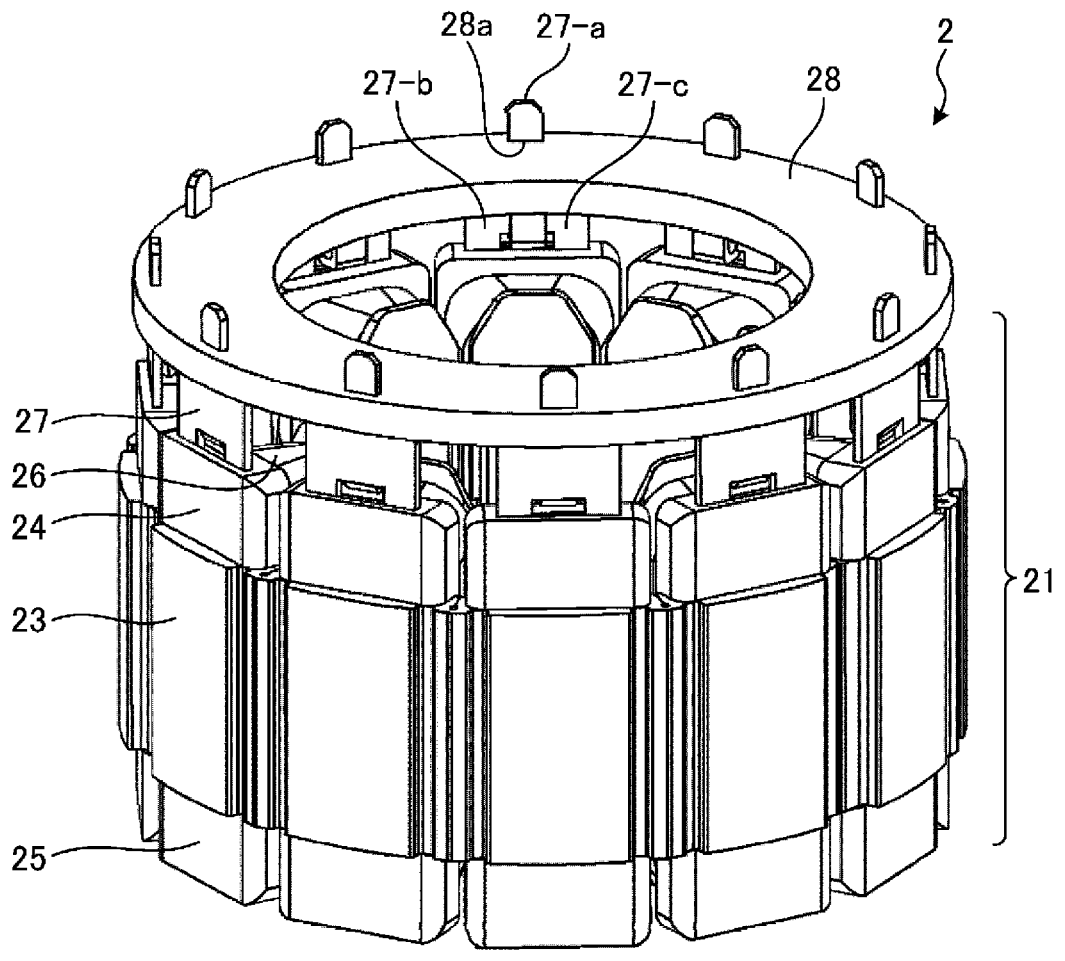
FIG. 1 is a perspective view illustrating a configuration example of a stator according to the present embodiment.

A motor according to an embodiment will be described below with reference to the drawings. Note that the present invention is not limited to the embodiment described above. Furthermore, the dimensional relationships between elements, proportions of the elements, and the like in the drawings may differ from reality. The drawings may each include parts having mutually different dimensional relationships and proportions. Furthermore, the contents described in one embodiment or modified example are applied in principle to other embodiments or modification examples.

FIG. 1 is a perspective view illustrating a configuration example of a stator 2 according to the present embodiment. FIG. 1 illustrates a stator 21 and an annular substrate (hereinafter, referred to as a connecting plate) 28 provided at the stator 21. The stator 21 is formed in an annular shape by a plurality of (for example, three) segments 23 by attaching upper side insulators 24 and lower side insulators 25 to pieces of the segments 23 formed by coupling a plurality of (for example, two) the pieces via a bendable coupling part, winding coils 26, and then bending the coupling part. Here, an insulator is configured by the upper side insulator 24 and the lower side insulator 25. The segments 23 are used as segments for forming a core serving as the entire stator. When three of the segments 23 are used, the number of the segments is three. The number of the segments is preferably three in order to increase rigidity with respect to second-order/fourth-order annular vibration modes, but may be any odd number of three or more. Further, the number of the pieces included in the plurality of segments 23 may be an even number, and the number of the plurality of segments 23 may be an odd number or a prime number. Even when the number of the pieces is an even number, setting the number of the segments 23 to an odd number or a prime number of three or more can suppress vibration of the motor and noise caused by the vibration.

The connecting plate 28 is provided for collectively wiring terminals 27 provided at upper portions of the upper side insulators 24 for each piece (for respective slots) of the segments 23. The connecting plate 28 is formed of a printed circuit board, a predetermined substrate provided with a printed circuit board or a mutual contact wire conductor (busbar), or the like. Note that the connecting plate 28 may be connected to the terminals 27 after the segments 23, temporarily assembled in the annular shape with the coils 26 wound, are inserted into the housing of the motor. Electrical connections of the coils 26 of the respective slots are collectively performed by the connecting plate 28 via the terminals 27. With this configuration, intersection between jumper wires can be avoided. Further, a guide part for guiding the jumper wire need not be provided at the insulator. With this configuration, a dimension of the stator in a rotation axis direction can be shortened, and dead space of the motor can be reduced. In the illustrated example, an end part 27-*a* of the terminal 27 is inserted into each of a plurality of hole parts 28*a* formed in the connecting plate 28, and a part of the end part 27-*a* of the terminal 27 projects outward from the surface of the connecting plate 28. The end part 27-*a* of the terminal 27 is electrically connected to a part of the wiring formed at the connecting plate 28. Projecting parts 27-*b* and 27-*c* fixed to the insulator are continuous with the end part 27-*a*.

Figure 2:
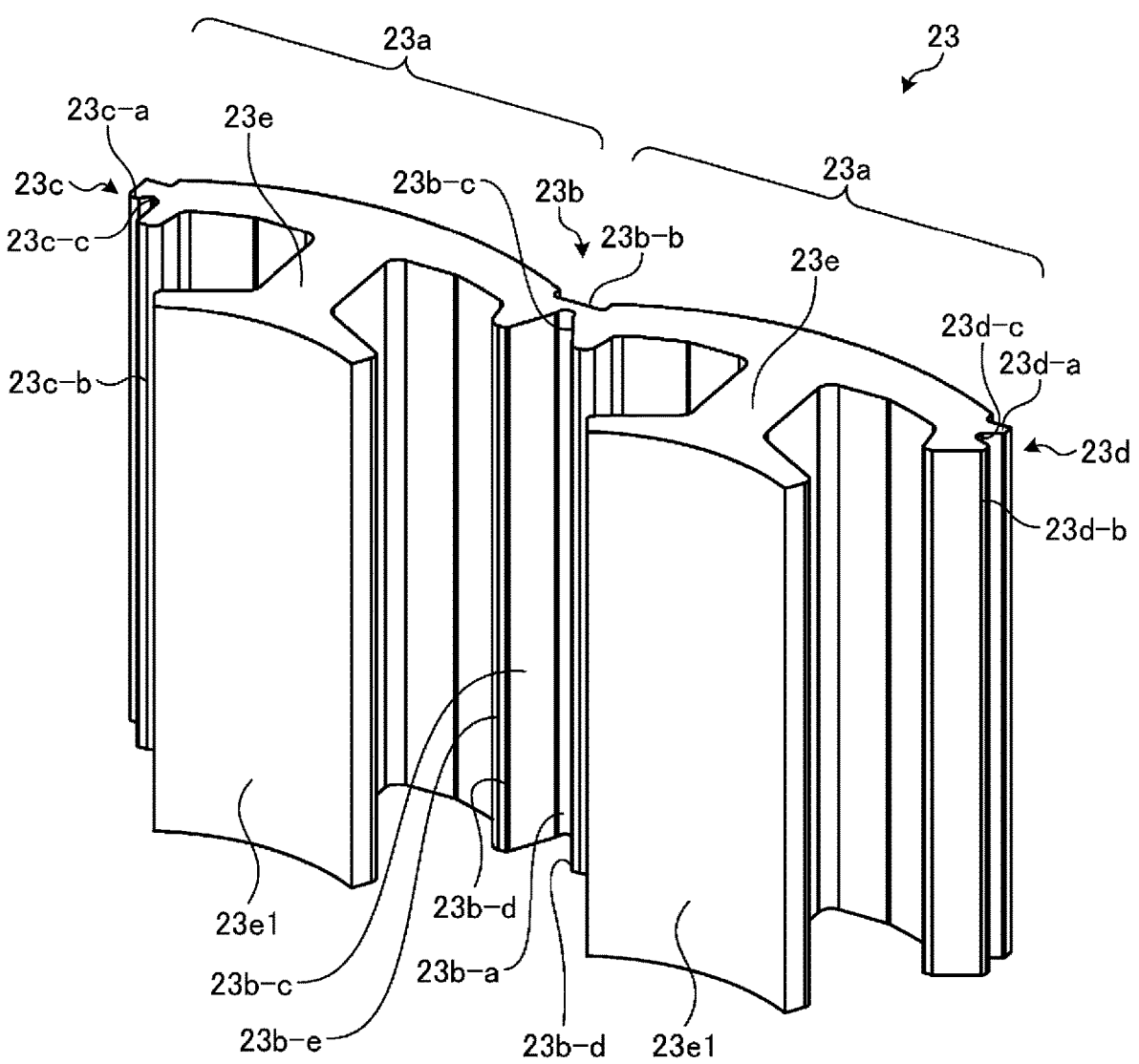
FIG. 2 is a perspective view illustrating an example of a shape of a segment.
Figure 3:
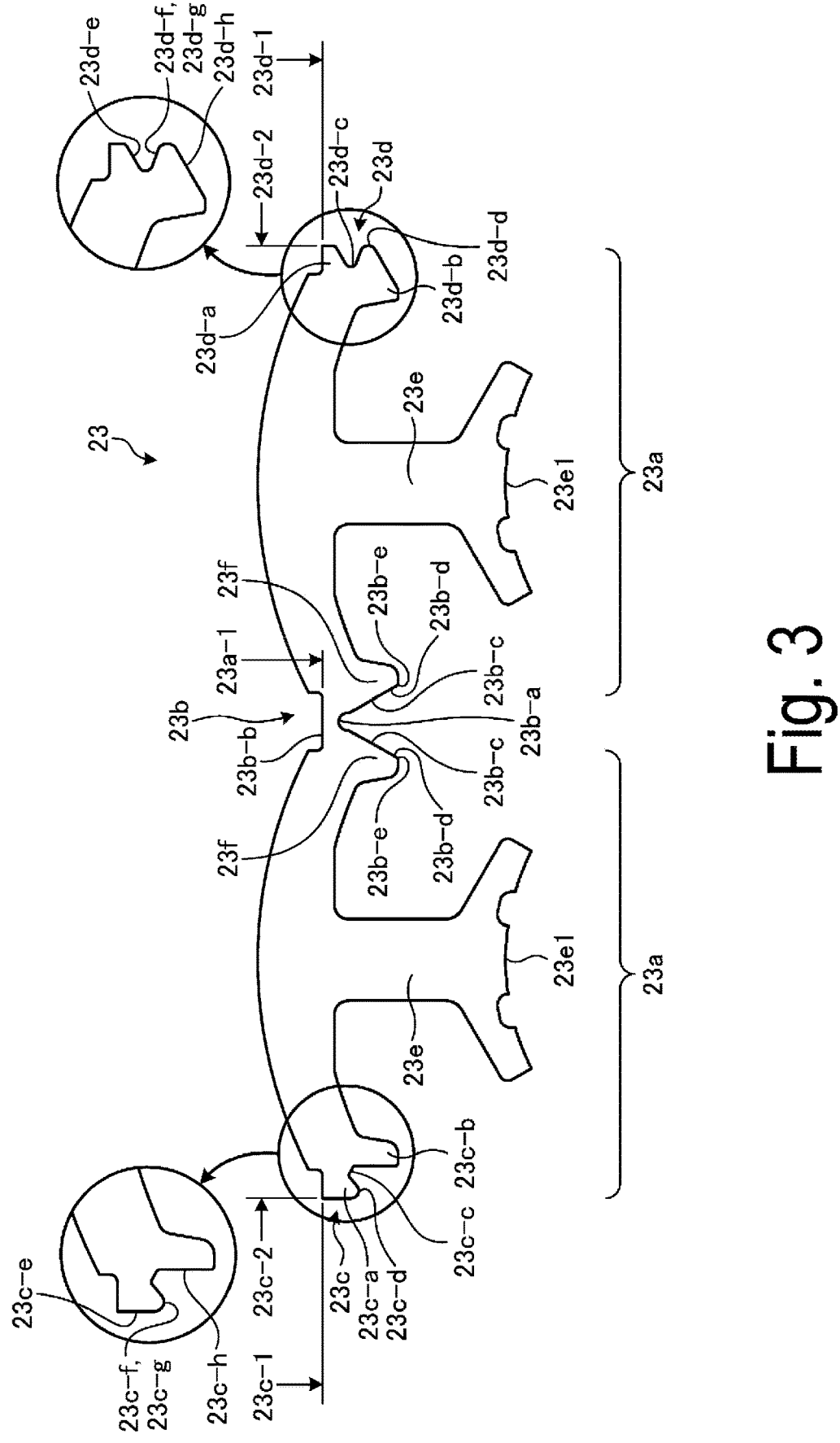
FIG. 3 is a plan view illustrating an example of the shape of the segment.

FIG. 2 is a perspective view illustrating an example of a shape of a segment. FIG. 3 is a plan view illustrating an example of the shape of the segment. In FIGS. 2 and 3, a steel sheet 22 is formed by punching an electromagnetic steel sheet with a die or the like. In addition, a plurality of the steel sheets 22 are stacked to form the segment 23.

The segment 23 is formed by stacking the plurality of steel sheets 22 as a magnetic body. Note that, in FIG. 2, illustration of an end surface appearing when the electromagnetic steel sheets are stacked is omitted. In the illustrated example, two pieces 23*a* with a substantially T-shaped planar shape are coupled via a coupling part 23*b*. Each piece 23*a* is formed with a tooth 23*e*. One end part 23*el* of the tooth 23*e* (an end part opposing a rotor 3 in a radial direction) serves as a magnetic pole part. A first recess part 23*b-a* recessed toward the outer peripheral side is formed at the inner peripheral side of the coupling part 23*b*. In addition, a second recess part 23*b-b* recessed toward the inner peripheral side is formed at the outer peripheral side of the coupling part 23*b*. The first recess part 23*b-a* has an arc shape, and the second recess part 23*b-b* has a rectangular shape. The coupling part 23*b* is formed to be thin between the first recess part 23*b-a* and the second recess part 23*b-b*, and can be easily bent in a direction of closing the first recess part 23*b-a*.

A pair of opposing surfaces 23*b-c* are provided from the first recess part 23*b-a* toward the inner peripheral side. The pair of opposing surfaces 23*b-c* are connected to a pair of opposing parts 23*b-d*. The pair of opposing parts 23*b-d* are located at the inner peripheral side with respect to the coupling part 23*b*. That is, the segment 23 is provided with a pair of projecting parts 23*f* projecting to the inner peripheral side between the respective pieces 23*a* and the coupling part 23*b*. The pair of opposing surfaces 23*b-c* and the pair of opposing parts 23*b-d* are located at the pair of projecting parts 23*f*, opposing each other. The pair of opposing surfaces 23*b-c* are planes, and the pair of opposing parts 23*b-d* are opposing lines (design contact lines) extending along the rotation axis direction of the motor 1. When the segment 23 is bent, the pair of opposing surfaces 23*b-c* approach each other and form a clearance. Then, the pair of opposing parts 23*b-d* come into contact with one another, or form a minute clearance. That is, the pair of opposing parts 23*b-d* come into contact or form a minute clearance according to a tolerance or error. Additionally, a pair of surfaces 23*b-e* are provided at the inner peripheral side with respect to the pair of opposing parts 23*b-d*, and are set in a region outward of the pair of opposing surfaces 23*b-c*. That is, the pair of surfaces 23*b-e* are provided at the distal end sides of the pair of projecting parts 23*f*.

The segment 23 is provided with engaging parts 23*c* and 23*d* at left and right end portions, and comes into contact with and engages with the engaging parts 23*c* and 23*d* of the adjacent segment 23 in a state of being bent in an annular shape. One engaging part 23*c* has two protruding parts 23*c-a* and 23*c-b* projecting to one side in the circumferential direction, and a recess part 23*c-c* provided between the two protruding parts 23*c-a* and 23*c-b*. The other engaging part 23*d* has two protruding parts 23*d-a* and 23*d-b* projecting to one side in the circumferential direction, and a recess part 23*d-c* provided between the two protruding parts 23*d-a* and 23*d-b* portion.

Of the two segments 23 disposed adjacently, the protruding part 23*c-a* of one segment 23 is engaged with the recess part 23*d-c* of the other segment 23, and the recess part 23*c-c* of the one segment 23 is engaged with the protruding part 23*d-b* of the other segment. The protruding part 23*c-a* of the one segment 23 has a top part 23*c-d*, and the protruding part 23*d-b* of the other segment 23 has a top part 23*d-d*.

The protruding part 23*c-a* of the one segment 23 and the recess part 23*d-c* of the other segment 23 have first planes 23*c-e* and 23*d-e* and third planes 23*c-f* and 23*d-f* opposing one another. The first plane 23*c-e* and the third plane 23*c-f* extend in the radial direction and the circumferential direction of the stator 2, and extend in directions intersecting one another toward the top part 23*c-d*. The recess part 23*c-c* of the one segment 23 and the protruding part 23*d-b* of the other segment 23 have second planes 23*c-h* and 23*d-h* and third planes 23*c-g* and 23*d-g* opposing one another. The second plane 23*d-h* and the third plane 23*d-g* extend in the radial direction and the circumferential direction of the stator 2, and extend in directions intersecting one another toward the top part 23*d-d*. Here, the third plane 23*c-f* and the third plane 23*c-g* are the same plane. Further, in the engaging part 23*d*, the third plane 23*d-f* and the third plane 23*d-g* are the same plane. In the protruding part 23*c-a* of the one segment 23 and the recess part 23*d-c* of the other segment 23, and in the recess part 23*c-c* of the one segment 23 and the protruding part 23*d-b* of the other segment 23, the third plane 23*c-f* and the third plane 23*d-f* oppose each other.

Note that in the linear state of the segment 23 illustrated in FIGS. 2 and 3, a surface 23*a-1* of the coupling part 23*b*, a surface 23*c*-1 of the engaging part 23*c*, and a surface 23*d*-1 of the engaging part 23*d* are located at the same position in the vertical direction of FIG. 3 and are disposed on a straight line. Further, in this state, a surface 23*c*-2 of the engaging part 23*c* and a surface 23*d*-2 of the engaging part 23*d* are parallel, and the surface 23*a*-1 of the coupling part 23*b* is orthogonal to the surfaces 23*c*-2 and 23*d*-2. The surfaces 23*a*-1, 23*c*-1, 23*c*-2, 23*d*-1, and 23*d*-2 serve as positioning surfaces when the coil 26 is wound around the segment 23 and when the segment 23 is mounted on a device.

Figure 4:
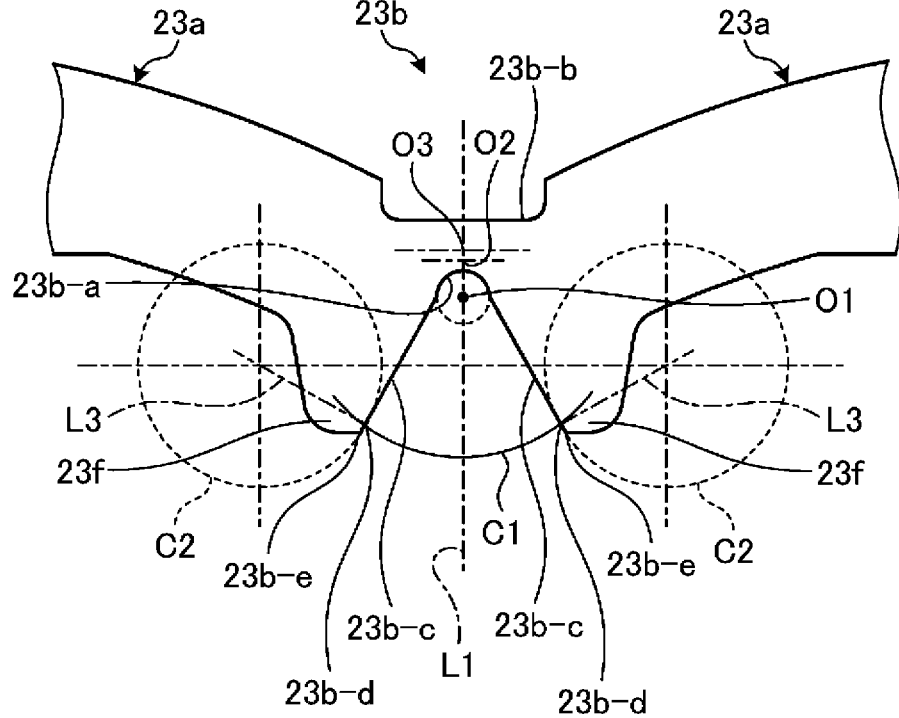
FIG. 4 is a plan view illustrating an example of a coupling part of the segment before bending.
Figure 5:
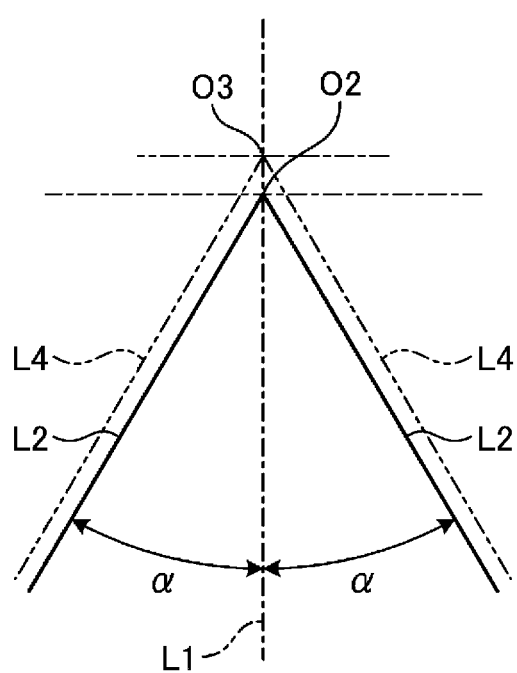
FIG. 5 is a diagram illustrating how to configure the shape of the coupling part of the segment.
Figure 6:
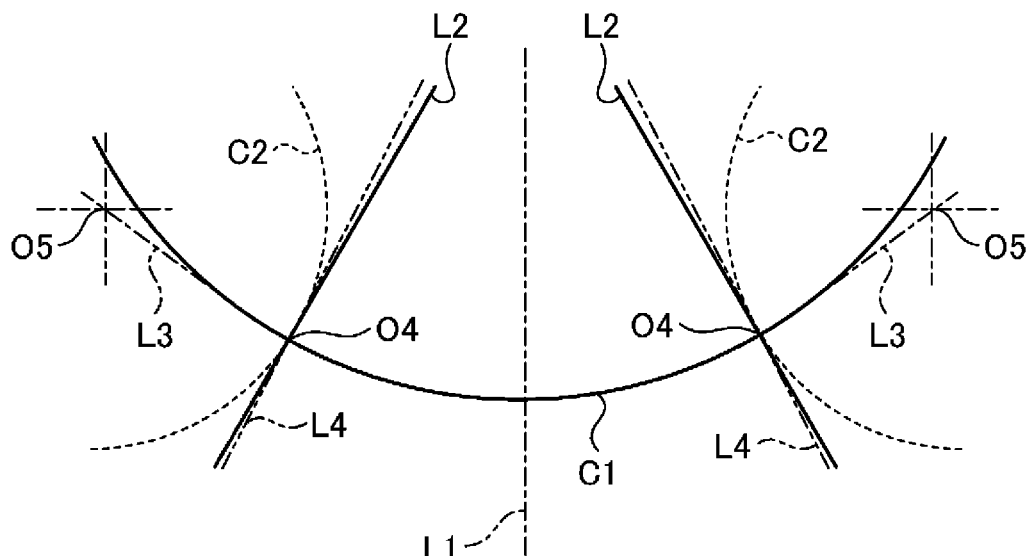
FIG. 6 is a diagram illustrating how to configure the shape of the coupling part of the segment.

Hereinafter, the shapes of the pair of opposing surfaces 23*b*-*c* and the pair of opposing parts 23*b*-*d* in the coupling part 23*b* will be described in detail. FIG. 4 is a plan view illustrating an example of the coupling part of the segment before bending. FIG. 5 is a diagram illustrating how to configure the shape of the coupling part of the segment. FIG. 6 is a diagram illustrating how to configure the shape of the coupling part of the segment. In FIGS. 4 to 6, the first recess part 23*b*-*a* is formed at the inner peripheral side and the second recess part 23*b*-*b* is formed at the outer peripheral side to narrow the width of the coupling part 23*b* in the radial direction. The first recess part 23*b*-*a* is an arc with a center O1 and has an arc shape, but may be, for example, an ellipse.

In the coupling part 23*b*, a design center O2 serving as a center of bending rotation of the two adjacent pieces 23*a* is set. The design center O2 is preferably at an intermediate position between the two adjacent pieces 23*a* and an intermediate position between the first recess part 23*b*-*a* and the second recess part 23*b*-*b*. In addition, an imaginary point O3 for determining the shape in the two adjacent pieces 23*a* is set in the coupling parts 23*b*. The imaginary point O3 is set at the outer peripheral side in the radial direction with respect to the design center O2. The design center O2 and the imaginary point O3 are disposed on a bending line L1 passing through the center of the stator 2 and running along the radial direction. Note that the center O1 of the first recess part 23*b*-*a* is also disposed on the bending line L1.

First, a first imaginary circle C1 passing through a design joining point with the design center O2 as the center is set. Next, a pair of straight lines L2 widening from the design center O2 to the left and right toward the design joining point at a predetermined angle α (for example, 15 degrees) is set. Note that in the present embodiment, since the stator 2 is constituted by six of the pieces 23*a*, the predetermined angle α is 15 degrees, but the predetermined angle α is set according to the number of the pieces 23*a* constituting the stator 2. Then, a pair of perpendicular lines L3 with respect to the pair of straight lines L2 passing through the first imaginary circle C1 and an intersection point O4 of the pair of straight lines L2 are set. A pair of second imaginary circles C2 having centers O5 on the pair of perpendicular lines L3 and having predetermined radii are set. Here, the predetermined radius of the second imaginary circle C2 is set in accordance with the radius of the stator 2. The predetermined radius of the second imaginary circle C2 is preferably, for example, in a range of 30% to 100% of the radius of the stator 2. Then, the pair of opposing surfaces 23*b*-*c* are disposed on tangent lines L4 extending from the imaginary point O3 and in contact with the pair of second imaginary circles C2. That is, the pair of opposing surfaces 23*b*-*c* are disposed on the tangent lines L4 extending from the imaginary point O3 and in contact with the pair of second imaginary circles C2, first ends are connected to the first recess part 23*b*-*a*, second ends are connected to the pair of second imaginary circles C2, and the second imaginary circles C2 form the surfaces 23*b*-*e* at the inner peripheral side with respect to the opposing parts 23*b*-*d*.

Figure 7:
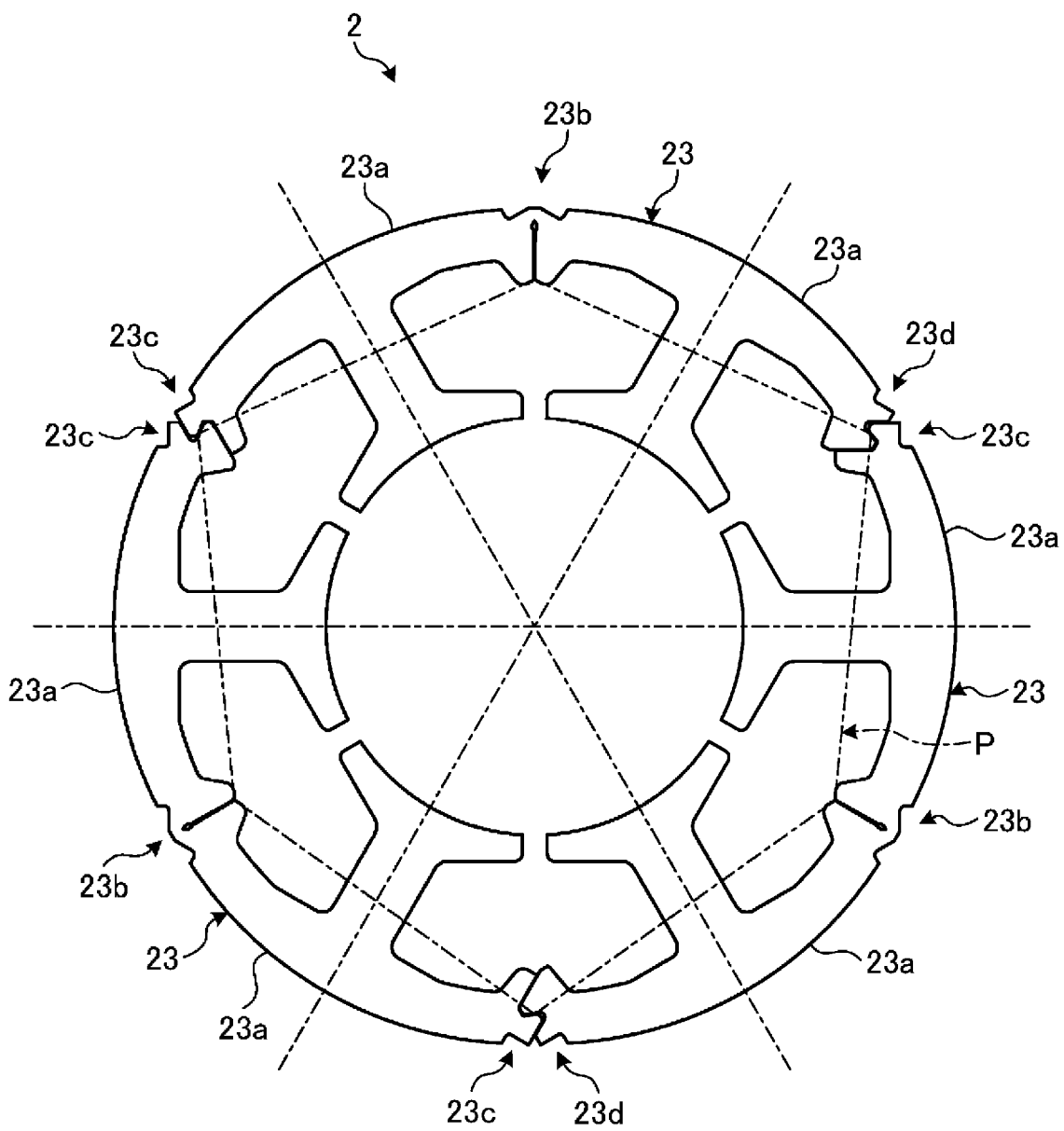
FIG. 7 is a plan view illustrating an example of the stator formed by assembling a plurality of the segments.
Figure 8:
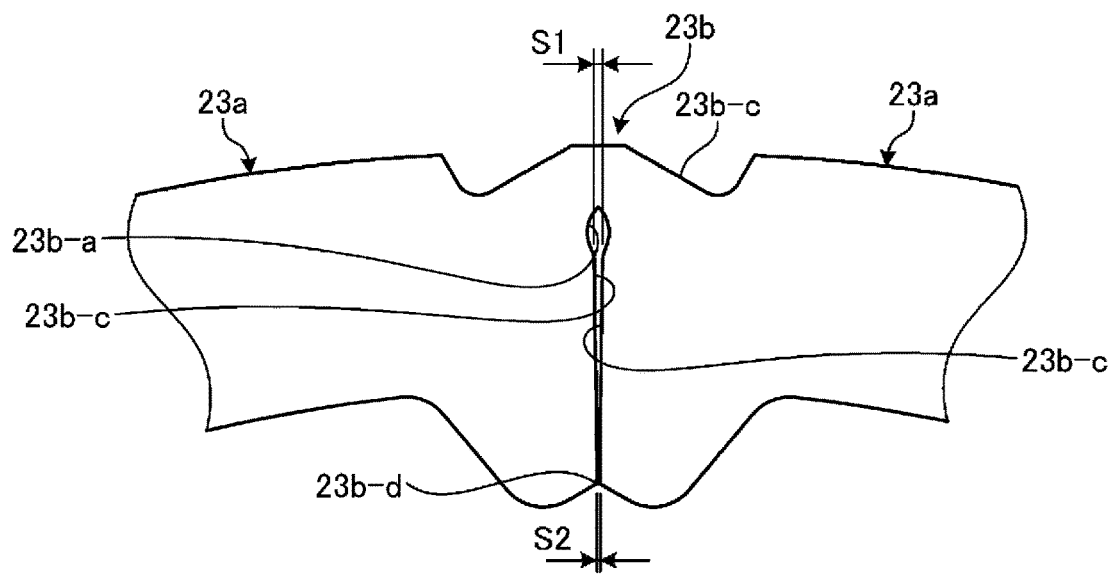
FIG. 8 is a plan view illustrating an example of the coupling part of the segment after bending.

FIG. 7 is a plan view illustrating an example of the stator formed by assembling the plurality of segments. FIG. 8 is a plan view illustrating an example of the coupling part of the segment after bending. In FIG. 7, the stator 2 is configured by engaging three of the segments 23 in an arc shape in the circumferential direction. Since the segment 23 includes the two pieces 23*a*, the stator 2 is configured by coupling six of the pieces 23*a* in an arc shape in the circumferential direction. The stator 2 configured by coupling the six pieces 23*a* forms a hexagon (preferably, a regular hexagon) P having the coupling parts 23*b* of the respective pieces 23*a* and the engaging parts 23*c* and 23*d* of the respective pieces 23*a* constituting the respective segments 23 as vertices. More specifically, the vertex at the coupling part 23*b* of each piece 23*a* is the opposing part 23*b*-*d*.

In FIG. 8, when each segment 23 is bent inward at the coupling part 23*b*, the pair of opposing surfaces 23*b*-*c* approach each other. Ideally, the pair of opposing parts 23*b*-*d* are in contact with one another, but a clearance may be formed between the pair of opposing parts 23*b*-*d* in some cases. At this time, the mutual gap between the pair of opposing surfaces 23*b*-*c* gradually narrows from the first recess part 23*b*-*a* to the pair of opposing parts 23*b*-*d*. In other words, the mutual gap between the pair of opposing surfaces 23*b*-*c* decreases from the first recess part 23*b*-*a* to the pair of opposing parts 23*b*-*d*. That is, the clearance between the pair of opposing surfaces 23*b*-*c* in the coupling part 23*b* gradually decreases from the outer peripheral side toward the inner peripheral side. For example, a clearance S1 at the outer peripheral side in the pair of opposing surfaces 23*b*-*c* is 0.08 mm, and a clearance S2 at the inner peripheral side in the pair of opposing surfaces 23*b*-*c* is 0.02 mm. The sizes of the clearances S1 and S2 vary due to tolerance and error. Then, the clearances S1 and S2 are smaller (about $\frac{1}{10}$ to $\frac{1}{5}$) than a clearance in the radial direction between the stator 2 and the rotor 3 in the assembled motor 1. That is, when each segment 23 is bent inward at the coupling part 23*b*, ideally, the pair of opposing parts 23*b*-*d* come into line contact with one another. Therefore, the distance between the pair of opposing surfaces 23*b*-*c* provided from the first recess part 23*b*-*a* to the opposing parts 23*b*-*d* gradually narrows across the entire region in the radial direction.

Figure 9:
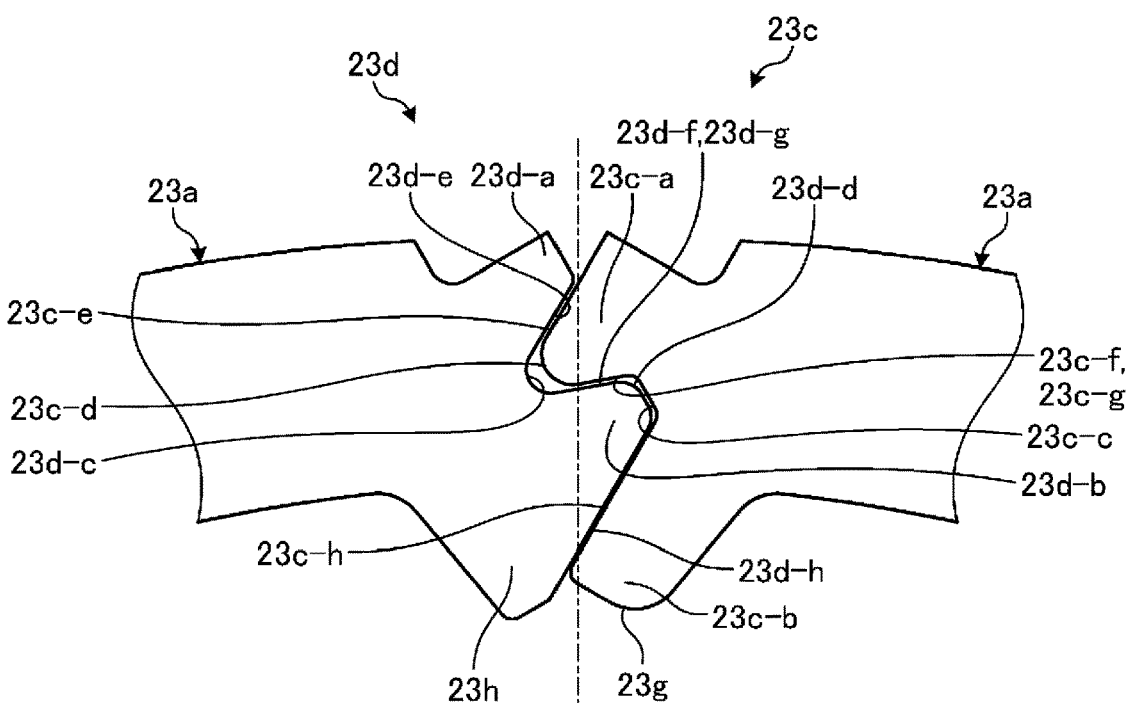
FIG. 9 is a plan view illustrating an example of engaging parts of the segment after assembly.
Figure 10:
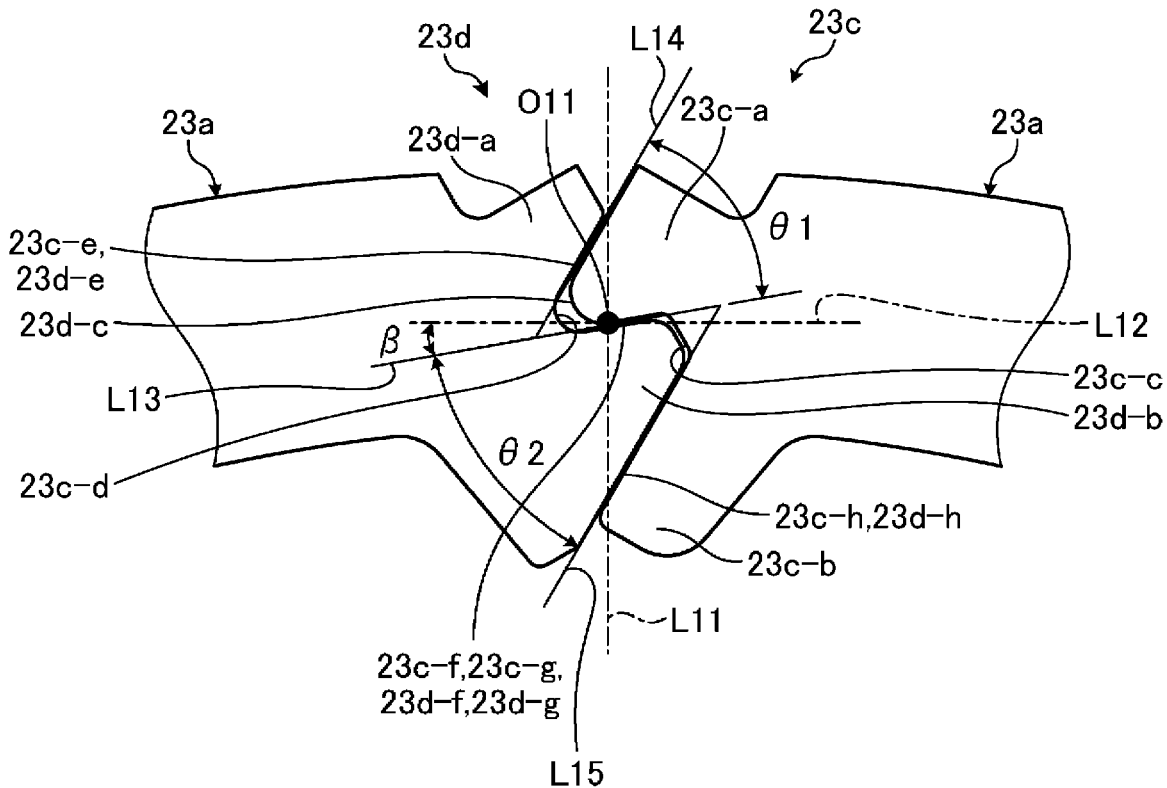
FIG. 10 is a diagram illustrating how to configure shapes of the engaging parts of the segment.

Now, the shapes of the protruding parts 23*c*-*a* and 23*c*-*b* and the recess part 23*c*-*c* in the engaging part 23*c* and the protruding parts 23*d*-*a* and 23*d*-*b* and the recess part 23*d*-*c* in the engaging part 23*d* will be described in detail. FIG. 9 is a plan view illustrating an example of the engaging parts of the segment after assembly. FIG. 10 is a diagram illustrating how to configure the shapes of the engaging parts of the segment. In FIG. 9, one engaging part 23*c* is provided at an end part of one piece 23*a* in the segment 23, and the other engaging part 23*d* is provided at an end part of the other piece 23*a* in the segment 23. In the two adjacent segments 23, the engaging part 23*c* and the engaging part 23*d* are in contact and are engaged with one another. The protruding part 23*c*-*a* of one segment 23 is engaged with the recess part 23*d*-*c* of the other segment 23, and the recess part 23*c*-*c* of the one segment 23 is engaged with the protruding part 23*d*-*b* of the other segment.

In FIG. 10, an engagement line L11 passing through the center of the stator 2 and running along the radial direction is set. In addition, a tangent line L12 at an intersection point between an engagement line L11 and a circumcircle (a circle passing through the design joining point) of the hexagon illustrated in FIG. 7 having the center of the stator 2 as the center is set. Here, the engagement line L11 is orthogonal to the tangent line L12 at a position, and this position is set as an imaginary engagement point O11. A first inclined line L13 passing through the imaginary engagement point O11 and intersecting with the tangent line L12 at a positive (counterclockwise rotation) angle β is set. In the present embodiment, in the above-described shapes of the engaging parts 23c and 23d, in FIG. 10, the first inclined line L13 is the line running from the lower left side to the upper right side. However, when the shapes of the engaging parts 23c and 23d are opposite, the first inclined line L13 is a line running from the lower right side to the upper left side.

A second inclined line L14 and a third inclined line L15 intersecting with the first inclined line L13 at acute angles θ1 and θ2 are set. The second inclined line L14 intersects with the first inclined line L13 at one side in the length direction of the first inclined line L13, and the third inclined line L15 intersects with the first inclined line L13 at the other side in the length direction of the first inclined line L13. Here, since the second inclined line L14 is parallel to the third inclined line L15, the acute angles θ1 and θ2 are the same angle. However, the acute angles θ1 and θ2 may be different angles, and the second inclined line L14 need not be parallel to the third inclined line L15. Moreover, the second inclined line L14 and the third inclined line L15 preferably intersect with the engagement line L11 at the intermediate position between the engaging part 23c and the engaging part 23d.

In one engaging part 23c, the protruding part 23c-a is constituted by the first plane 23c-e along the second inclined line L14 and the third plane 23c-f along the first inclined line L13. The recess part 23c-c is constituted by the third plane 23c-g along the first inclined line L13 and the second plane 23c-h along the third inclined line L15. In the other engaging part 23d, the recess part 23d-c is constituted by a first plane 23d-e along the second inclined line L14 and the third plane 23d-f along the first inclined line L13. The protruding part 23d-b is constituted by the third plane 23d-g along the first inclined line L13 and the second plane 23d-h along the third inclined line L15.

In the protruding part 23c-a of the engaging part 23c, the top part 23c-d projects in the circumferential direction of the stator 2 and toward the inner peripheral side. That is, the protruding part 23c-a and the recess part 23c-c in the engaging part 23c and the protruding part 23d-b and the recess part 23d-c in the engaging part 23d are formed by the first inclined line L13, the second inclined line L14, and the third inclined line L15. Then, the first inclined line L13, the second inclined line L14, and the third inclined line L15 are inclined in the same direction with respect to the tangent line L12 orthogonal to the engagement line L11.

The protruding part 23c-a engages with the recess part 23d-c, and the protruding part 23d-b engages with the recess part 23c-c. The engagement position of the protruding part 23c-a and the recess part 23d-c and the engagement position of the protruding part 23d-b and the recess part 23c-c are disposed side by side in the radial direction of the stator 2. That is, the first planes 23c-e and 23d-e, the third planes 23c-f, 23c-g, 23d-f, and 23d-g, and the second planes 23c-h and 23d-h are disposed side by side in the radial direction of the stator 2. With respect to the first planes 23c-e and 23d-e, the third planes 23c-f, 23c-g, 23d-f, and 23d-g, and the second planes 23c-h and 23d-h are disposed at the inner peripheral side. The areas of the second planes 23c-h and 23d-h and the areas of the first planes 23c-e and 23d-e are larger than the areas of the first planes 23c-e and 23d-e, but no limitation is intended, and the areas of the first planes 23c-e and 23d-e may be larger than the areas of the second planes 23c-h and 23d-h.

That is, the engaging parts 23c and 23d are provided with bulging parts 23g and 23h projecting to the inner peripheral side of the stator 2. The second planes 23c-h and 23d-h are disposed at the sides of the bulging parts 23g and 23h. A contactable area between the second plane 23c-h of the recess part 23c-c in the engaging part 23c and the second plane 23d-h of the protruding part 23d-b in the engaging part 23d is larger than a contactable area between the first plane 23c-e of the protruding part 23c-a in the engaging part 23c and the first plane 23d-e of the recess part 23d-c in the engaging part 23d. Here, in the engaging part 23c and the engaging part 23d, the first plane 23c-e, the third planes 23c-f and 23c-g, and the second plane 23c-h are not necessarily in contact with the first plane 23d-e, the third planes 23d-f and 23d-g, and the second plane 23d-h, but are in a surface contact, line contact, or point contact state according to tolerance, a manufacturing error, or the like, thereby forming a clearance. The contactable area is an area when design tolerance, a manufacturing error, or the like is not present. That is, the contactable area is an area of the first planes 23c-e and 23d-e and the second planes 23c-h and 23d-h.

The size of the clearance formed in the second planes 23c-h and 23d-h is smaller than the size of the clearance formed in the first planes 23c-e and 23d-e. To be more specific, the area of the protruding part 23d-b and the recess part 23c-c contactable at the position of the third inclined line L15 is larger than the area of the protruding part 23c-a and the recess part 23d-c contactable at the position of the second inclined line L14. Further, a dimensional tolerance in design of the protruding part 23d-b and the recess part 23c-c at the position of the third inclined line L15 is smaller than a dimensional tolerance in design of the protruding part 23c-a and the recess part 23d-c at the position of the second inclined line L14. That is, in the adjacent segments 23, the positions of the protruding part 23c-b and the protruding part 23d-b contactable with the third inclined line L15 in the engaging parts 23c and 23d become paths of magnetic flux (magnetic paths). However, the magnitude relationship between the first plane and the second plane may be reversed such that the first plane serves as a path of magnetic flux (magnetic path).

Figure 11:
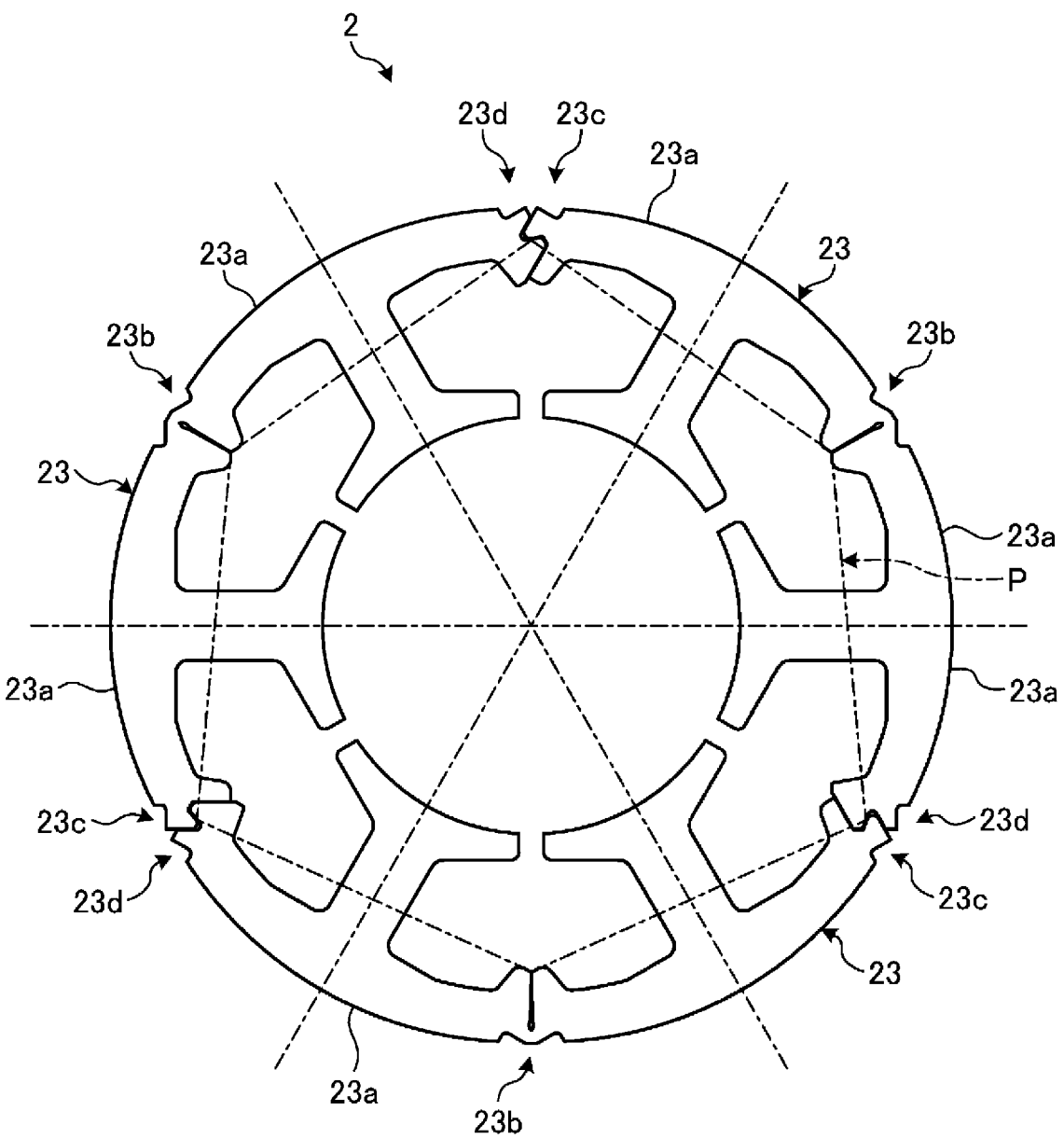
FIG. 11 is a plan view illustrating an example of the stator formed by assembling the plurality of segments.

FIG. 11 is a plan view illustrating an example of the stator formed by assembling the plurality of segments. In FIG. 11, as described above, the stator 2 is configured by engaging the three segments 23 in an arc shape in the circumferential direction. Since the segment 23 includes the two pieces 23a, the stator 2 is configured by coupling six of the pieces 23a in an arc shape in the circumferential direction. The stator 2 configured by coupling the six pieces 23a forms the hexagon P having the coupling parts 23b of the respective pieces 23a and the engaging parts 23c and 23d of the respective pieces 23a constituting the respective segments 23 as the vertices. More specifically, the vertex at the engaging part 23c or 23d of each piece 23a is the imaginary engagement point O11.

Figure 12:
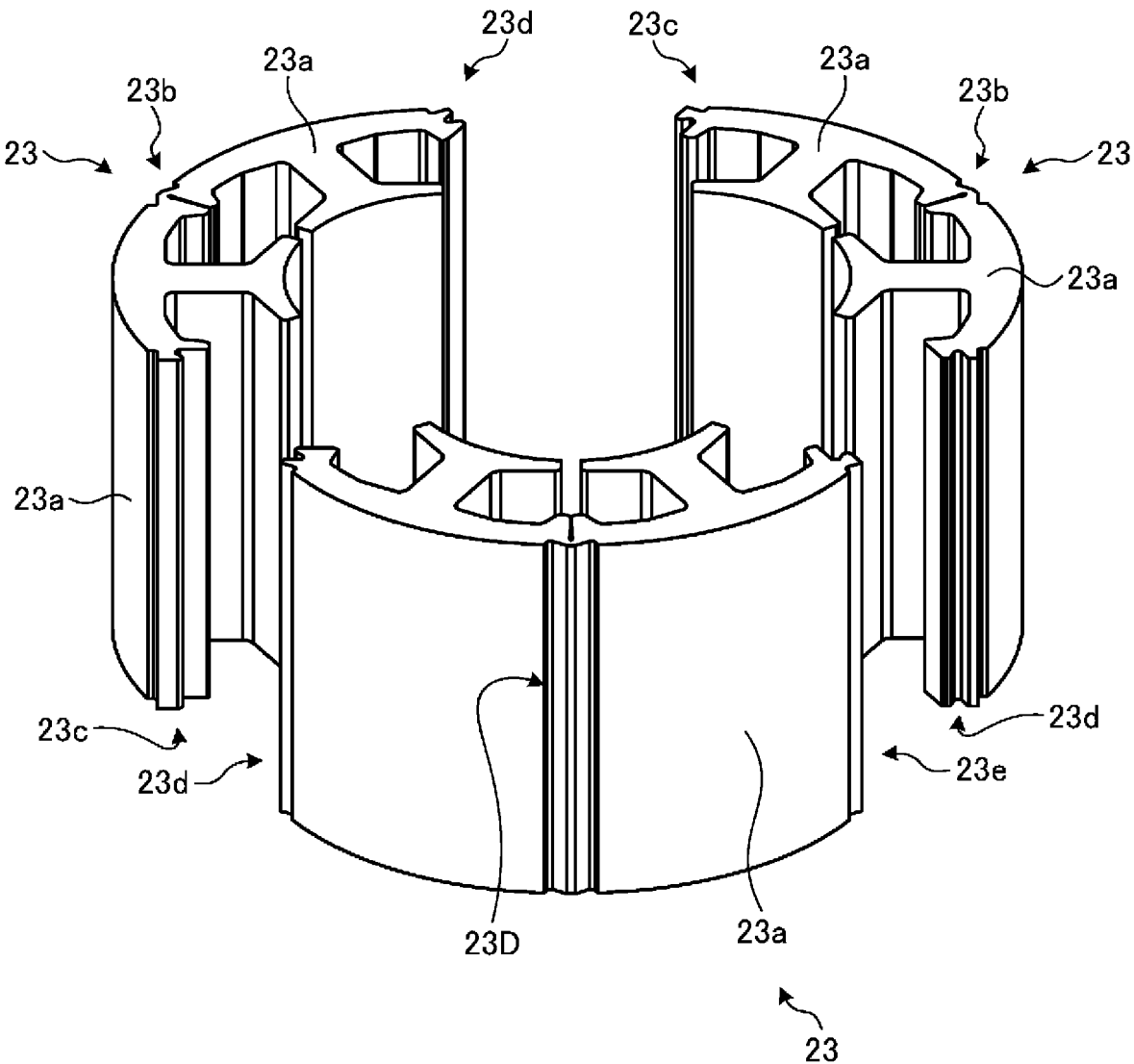
FIG. 12 is a perspective view illustrating the plurality of segments before assembly.
Figure 13:
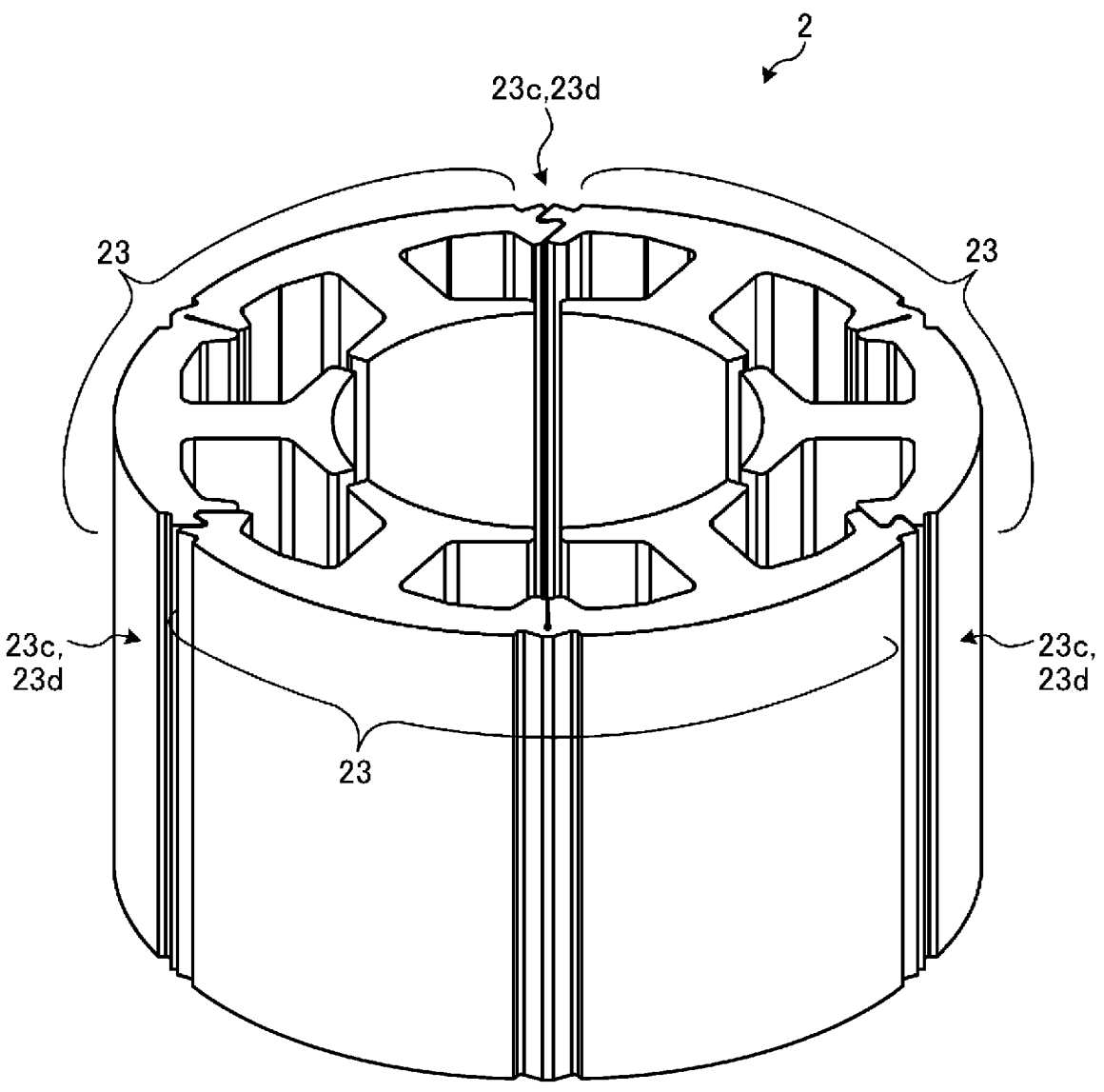
FIG. 13 is a perspective view illustrating the plurality of segments after assembly.

FIG. 12 is a perspective view illustrating the plurality of segments before assembly. FIG. 13 is a perspective view illustrating the plurality of segments after assembly. Note that FIG. 12 and FIG. 13 shows formation of an annular core. In practice, as described above, the upper side insulator 24 and the lower side insulator 25 are mounted to each piece 23a of the segment 23, the coil is wound, and then bending is performed. In FIG. 12, the three respective segments 23 are bent into an arc shape and then combined to form the annular core as illustrated in FIG. 13.

In a conventional stator of a type having an annularly-bent continuous band-shaped core, since annular bending is performed in one operation for a range of 3600 of one round, excessive force may act on some coupling parts to deteriorate roundness, and vibration may be generated by excitation force in a radial direction according to the number of magnetic poles of the magnet. In contrast, in the present embodiment, the plurality of (for example, three) segments 23 are combined after each of the plurality of segments 23 is bent into the arc shape. Therefore, roundness can be improved. In other words, the value of roundness can be reduced. As a result, a reduction in vibration and noise due to excitation force in the radial direction according to the number of magnetic poles of the magnet can be expected.

Additionally, in the conventional stator of the type having an annularly-bent continuous band-shaped core, since end parts are connected at one site in one round, rigidity may be low with respect to second-order/fourth-order annular vibration modes, and vibration and noise may also be generated due to this. In contrast, in the present embodiment, since the number of segments is an odd number, for example, three, connection parts of the segments do not oppose each other via the center of the circle, and rigidity is high with respect to second-order/fourth-order annular vibration modes. As a result, a reduction in vibration and noise can be expected.

Further, in the conventional stator, a pair of opposing surfaces are brought into surface contact by bending the segments inward at design positions of the coupling parts. In this case, when the bending starting points of the segments deviate from the design positions, the pair of opposing surfaces come into a line contact state, and a clearance is formed between the pair of opposing surfaces. Then, when the plurality of segments are combined in an annular shape, the roundness of the stator deteriorates. In contrast, in the stator 2 of the present embodiment, when the segments 23 are bent inward at the design positions of the coupling parts 23b, a clearance is intentionally formed between the pair of opposing surfaces 23b-c, and ideally, the pair of opposing parts 23b-d are brought into line contact with one another. Then, when the segments 23 are combined in the annular shape after bending, the hexagon P having the six vertices is formed. In the case, even when the bending starting point of the segment 23 deviates from the design position, the shape of the hexagon P is restricted and does not largely move. Therefore, when the plurality of segments 23 are combined in the annular shape, good roundness of the stator 2 is ensured. Note that the six vertices of the hexagon P are the three opposing parts 23b-d and the three imaginary engagement points O11.

Further, in the conventional stator, when the plurality of segments are combined in the annular shape, the engaging parts are engaged with one another so as to be merely in contact. In this case, while assembly of the mutual segments is easy, engagement between the engaging parts of the segments is insufficient, and the segments move outward or inward about the engaging parts, causing deterioration of roundness. In contrast, in the stator 2 of the present embodiment, the protruding parts 23c-a and 23d-b and the recess parts 23c-c and 23d-c of the engaging parts 23c and 23d are fitted to one another while forming an acute angle shape. Therefore, the engaging parts 23c and 23d suppress the segments 23 from expanding outward or inward, thereby suppressing deterioration of roundness.

That is, when the three segments 23 are combined in the stator 2, first, as illustrated in FIG. 12, the three segments 23 are disposed at intervals in the circumferential direction. Next, the three segments 23 are moved inward toward the center, and the respective engaging parts 23c and 23d are engaged with one another. Then, as illustrated in FIG. 13, the three segments 23 are combined in the annular shape to form the stator 2. In the stator 2 formed by combining the three segments 23, the shapes of the engaging parts 23c and 23d inhibit one segment 23 or two segments 23 from moving in the radial direction. Therefore, roundness is ensured and handling of the stator 2 is facilitated. However, when the three segments 23 are combined, the stator 2 may be configured by moving the three segments 23 in the axial direction and engaging the respective engaging parts 23c and 23d with one another.

Figure 14:
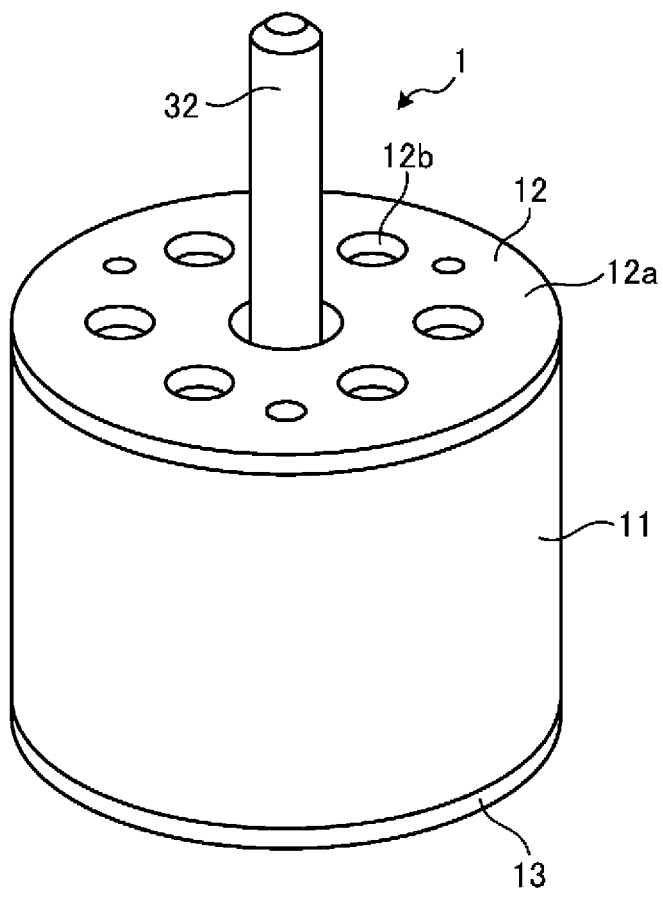
FIG. 14 is a perspective view illustrating a configuration example of a motor.
Figure 15:
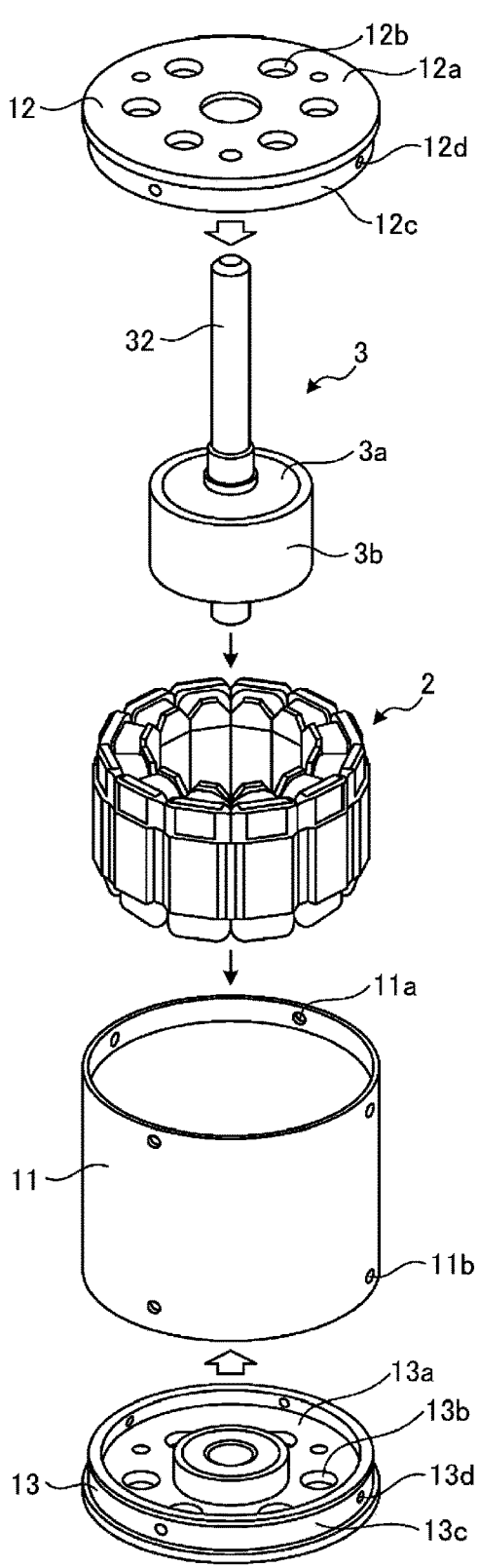
FIG. 15 is a divided perspective view illustrating a configuration example of the motor.

FIG. 14 is a perspective view illustrating a configuration example of the motor. FIG. 15 is a divided perspective view illustrating a configuration example of the motor. In FIG. 14, the motor 1 includes a tubular part 11, lid parts 12 and 13, and a shaft 32. The tubular part 11 and the lid parts 12 and 13 form a housing. In FIG. 15, the stator 2 is inserted into (press-fitted to) the cylindrical tubular part 11, the rotor 3 is disposed in a space inside the stator 2, and the shaft 32 of the rotor 3 is rotatably supported by the upper and lower lid parts 12 and 13 holding bearings. In the longitudinal direction of the rotor 3, a plurality of hole parts 12b are formed in a surface 12a of the lid part 12 opposing the stator 2, and a plurality of hole parts 12d are formed in an outer peripheral part 12c of the lid part 12. Similarly, in the longitudinal direction of the rotor 3, a plurality of hole parts 13b are formed in a surface 13a of the lid part 13 opposing the stator 2, and a plurality of hole parts 13d are formed in an outer peripheral part 13c of the lid part 13. Members such as screws may be inserted into and fixed to the hole parts 12d and 13d formed in the outer peripheral parts 12c and 13c of the lid parts 12 and 13 and hole parts 11a and 11b formed in the outer peripheral part of the tubular part 11. In the rotor 3, in the illustrated example, a rotor yoke 3a serving as a magnetic body is provided at the shaft 32, and an annular magnet 3b is provided at the outer peripheral surface of the rotor yoke 3a.

Note that the rotor 3 may include the rotor yoke 3a formed in an annular shape by stacking electromagnetic steel sheets as magnetic members, and the shaft 32 may be provided at the central part of the rotor yoke 3a so as to extend through the rotor yoke 3a. For example, the rotor yoke 3a is formed in the annular shape by bending four substantially arch-shaped pieces coupled by coupling parts such that the rod-like shaft 32 is sandwiched between the pieces, and connection parts at end parts of the segments are connected by laser welding or the like along the axial direction. Additionally, the rotor yoke 3a is provided with a hole part for generating reluctance torque, and a magnet is disposed in the hole part as necessary. Note that the terminals 27 and the connecting plates 28 of the stator 2 are not illustrated.

The embodiment of the present invention has been described above, but the present invention is not limited to the embodiment described above, and various modifications are possible without departing from the spirit of the present invention.

As described above, the motor according to the present embodiment includes the stator, the stator includes the plurality of segments coupled via the engaging parts, and the segment includes the plurality of pieces coupled via the coupling part. The plurality of pieces are disposed in an arc shape, and the plurality of segments are disposed in an annular shape. The engaging part includes the two protruding parts projecting to the circumferential direction side and the recess part provided between the two protruding parts. Of the two segments disposed adjacently, the protruding part of one segment engages with the recess part of another segment, and the recess part of the one segment engages with the protruding part of the other segment. The two protruding parts of the one segment and the other segment have the top parts, and the protruding part of the one segment and the recess part of the other segment have the first plane and the third plane opposing one another. The first plane and the third plane extend in the radial direction and the circumferential direction of the stator, and extend in directions intersecting one another toward the top part. With this configuration, roundness is improved to reduce vibration of the stator and improve productivity.

In addition, the top parts of the protruding parts of the one segment and the other segment project toward the inner peripheral side of the stator. With this configuration, the protruding part and the recess part of the engaging parts are appropriately engaged, assembly can be performed by a simple method, and the stator can be appropriately assembled with good roundness.

In addition, the recess part of the one segment and the protruding part of the other segment have the second plane and the third plane opposing one another, and the second plane and the third plane extend in the radial direction and the circumferential direction of the stator and extend in the directions intersecting one another toward the top part. With this configuration, the roundness of the stator can be further improved.

In addition, the first plane and the second plane form an acute angle with respect to a line along the circumferential direction orthogonal to the center line along the radial direction of the stator, and the third plane forms a positive angle with respect to the line along the circumferential direction orthogonal to the center line along the radial direction of the stator. With this configuration, when the adjacent segments are combined at the engaging parts, the engaging parts can suppress the segments from expanding to the outer peripheral side and the inner peripheral side.

In addition, the first plane and the second plane are disposed side by side in the radial direction of the stator, the second plane is disposed at the inner peripheral side with respect to the first plane, and the area of the second plane is different from the area of the first plane. With this configuration, the positions of the protruding part and the recess part engaged in the second plane form a magnetic path, the cross-sectional area of the flow path of the magnetic flux interlinking with a stator winding is increased, and magnetic resistance can be reduced. Therefore, deterioration of motor performance can be suppressed.

In addition, the engaging part has the bulging part projecting to the inner peripheral side, and the second plane is disposed at the bulging part side. With this configuration, without reducing the windable area in the engaging part, the cross-sectional area of the flow path of the magnetic flux interlinked with the stator winding can be ensured, and an increase in the outer diameter of the motor can be suppressed.

In addition, the clearance formed in the plane having the larger area among the first plane and the second plane is smaller than the clearance formed in the plane having the smaller area among the first plane and the second plane. With this configuration, the positions of the protruding part and the recess part engaging at the first plane and the second plane can be used as a magnetic path, and an increase in the outer diameter of the motor can be suppressed.

In addition, the first plane at the outer peripheral side and the second plane at the inner peripheral side are disposed in parallel. With this configuration, when the adjacent segments are combined at the engaging parts, movement of the segments to the outer peripheral side and the inner peripheral side can be effectively suppressed. In addition, since the surface parallel to the center line of the tooth is formed at each engaging part of the segment before bending, this surface can be used to accurately hold the segment in a winding machine, and therefore the space factor of the winding can be improved and attachment/detachment time of the segment can be shortened.

As described above, the motor according to the present embodiment includes the stator, the stator includes the plurality of segments, and the segment includes the plurality of pieces coupled via the coupling parts. The plurality of pieces are disposed in an arc shape, and the plurality of segments are disposed in an annular shape. The coupling part includes the first recess part, the pair of opposing surfaces having first ends continuous with both sides of the first recess part, and the pair of opposing parts provided at the second ends of the pair of opposing surfaces. The mutual gap between the pair of opposing surfaces decreases from the first recess part toward the pair of opposing parts. With this configuration, roundness is improved to reduce vibration of the stator and improve productivity.

In addition, the pair of opposing surfaces are planes. With this configuration, a predetermined amount of clearance can be ensured between the pair of opposing surfaces.

In addition, the pair of opposing parts are a pair of opposing lines parallel to the rotation axis direction of the motor. With this configuration, with the predetermined amount of clearance ensured between the pair of opposing surfaces, the pair of opposing surfaces can be brought into line contact at the opposing lines.

In addition, the pair of opposing parts oppose each other by being in contact with one another or via a minute clearance. With this configuration, even when the bending position of the segment deviates, deterioration of roundness can be suppressed.

In addition, the design center as the center of bending rotation in the plurality of pieces is set in the coupling part, the imaginary point is set outside the design center in the radial direction, and the pair of opposing surfaces are disposed on the pair of straight lines connecting the imaginary point and the pair of opposing parts. With this configuration, a minute clearance can be ensured between the pair of opposing surfaces.

In addition, the design center and the imaginary point are disposed on a straight line passing through the center of the motor and running along the radial direction. With this configuration, even when the bending position of the segment deviates, deterioration of roundness can be suppressed.

In addition, the first imaginary circle passing through the design joining point with the design center as the center is set, the pair of second imaginary circles having predetermined radii are set with points on the tangent line of the first imaginary circle as centers, and the pair of opposing surfaces are disposed on the tangent line in contact with the pair of second imaginary circles from the imaginary point. With this configuration, the pair of opposing surfaces can be set with high accuracy.

In addition, the region at the inner peripheral side relative to the pair of opposing surfaces is disposed on the pair of second imaginary circles. With this configuration, the second imaginary circle can be drawn with high accuracy, and the design accuracy of the pair of opposing surfaces can be improved. In this case, when the second imaginary circles are disposed with a slight clearance left in consideration of tolerance and error, correction processing of the roundness can be performed in a subsequent process, and roundness can be further improved.

In addition, in the coupling part, the first recess part is provided inward of the radial direction of the motor, and the second recess part is provided outward of the radial direction and opposes the first recess part. With this configuration, the segment can be bent at a predetermined position.

Note that in the embodiments described above, the segment includes two pieces, and the stator is configured by combining three segments. However, the number of pieces in the segment and the number of combined segments are not limited to these numbers. For example, the segment may have four pieces and three segments may be combined to configure the stator.

Moreover, the present invention is not limited to the embodiment described above. A configuration obtained by appropriately combining the above-mentioned constituent elements is also included in the present invention. Further effects and modified examples can be easily derived by a person skilled in the art. Thus, a wide range of aspects of the present invention is not limited to the embodiment described above and may be modified variously.

REFERENCE SIGNS LIST

1 Motor
11 Tubular part
2, 21 Stator
23 Segment
23a Piece
23b Coupling part
26 Coil
28 Connecting plate
3 Rotor
32 Shaft

The invention claimed is:

1. A motor, comprising:
a rotor; and
a stator, wherein
the stator includes an odd number of segments coupled via engaging parts,
the segments include a plurality of pieces coupled via a coupling part,
the plurality of pieces are disposed in an arc shape,
the segments are disposed in an annular shape,
each engaging part includes two protruding parts projecting to a circumferential direction side and a recess part provided between the two protruding parts,
of two segments disposed adjacently,
one protruding part of one segment engages with the recess part of the other segment, the recess part of the one segment engages with one protruding part of the other segment,
each of the two protruding parts of the one segment and the other segment has a top part,
the protruding part of the one segment and the recess part of the other segment each have first planes opposing one another and third planes opposing one another, and
the first plane and the third plane extend in a radial direction and a circumferential direction of the stator, and extend in directions intersecting one another toward the top part,
the top parts of the protruding parts of the one segment and the other segment project toward an inner peripheral side of the stator,
the recess part of the one segment and the protruding part of the other segment each have second planes opposing one another and third planes opposing one another,
the second planes and the third planes extend in the radial direction and the circumferential direction of the stator, and extend in the directions intersecting one another toward the top part,
the first planes and the second planes form an acute angle with respect to a line along a circumferential direction orthogonal to a center line along the radial direction of the stator, and the third planes form a positive angle with respect to a line along the circumferential direction orthogonal to the center line along the radial direction of the stator, and
a contactable area of each of the second planes is larger than a contactable area of each of the first planes.

2. The motor according to claim 1, wherein
the first planes at an outer peripheral side and the second planes at an inner peripheral side are disposed in parallel.

3. The motor according to claim 1, wherein
the first planes and the second planes are disposed side by side in the radial direction of the stator, the second planes are disposed at an inner peripheral side with respect to the first planes, and an area of each of the second planes is different from an area of each of the first planes.

4. The motor according to claim 3, wherein
the engaging parts each have a bulging part projecting to an inner peripheral side, and the second planes are disposed at the bulging part side.

5. The motor according to claim 3, wherein
a first clearance formed in the second planes is smaller than a second clearance formed in the first planes.

* * * * *